UNITED STATES PATENT OFFICE.

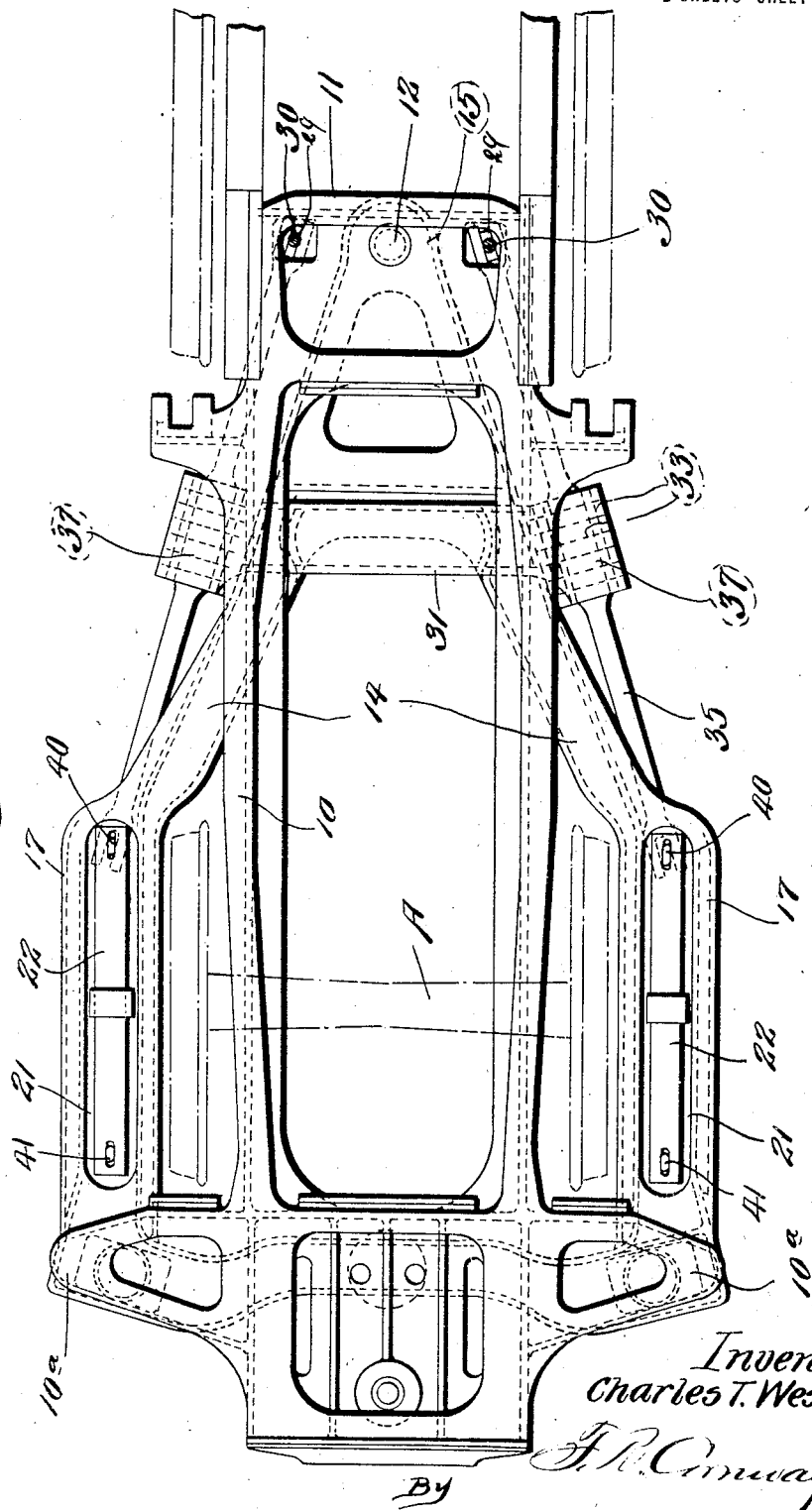

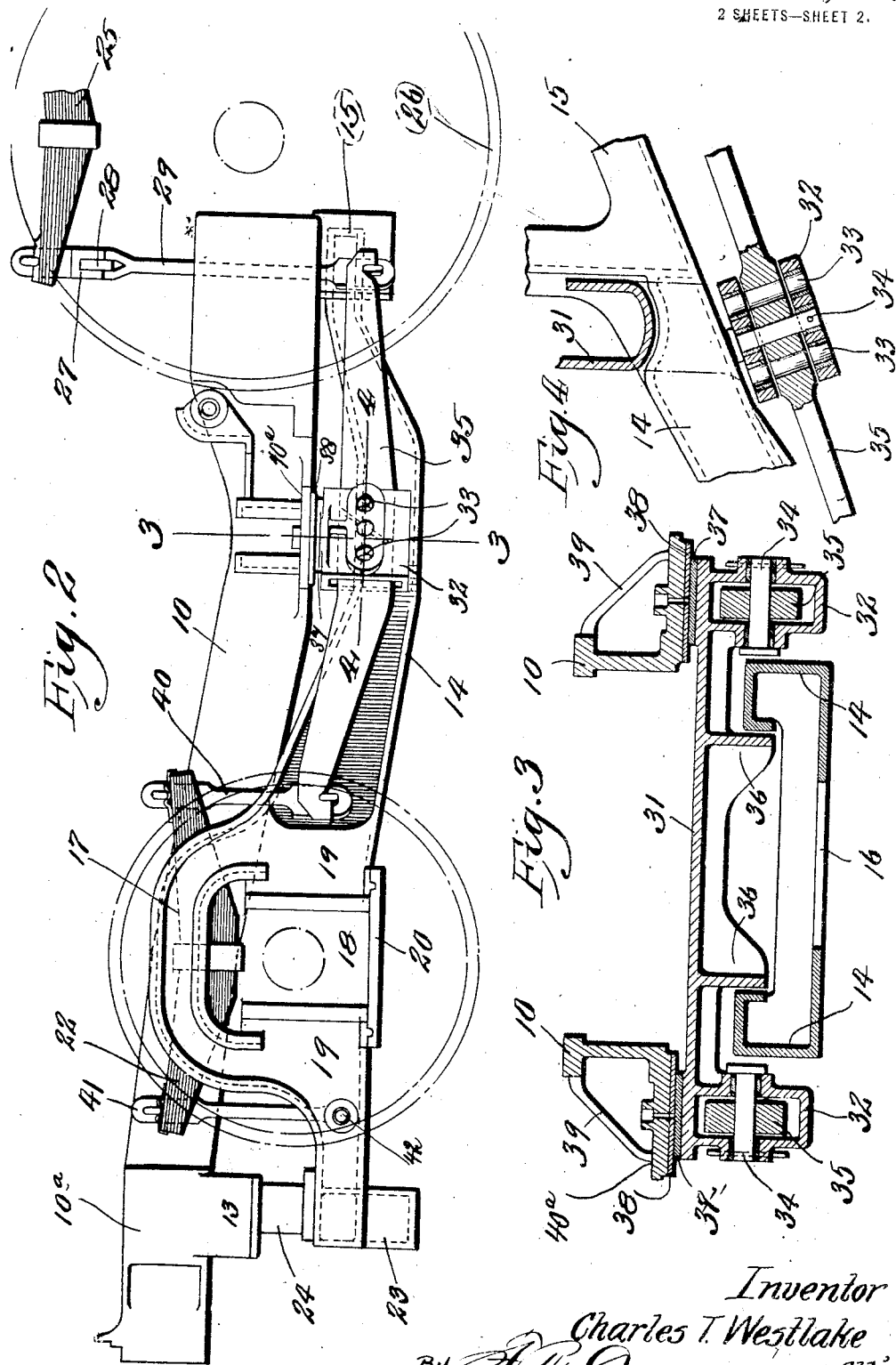

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE TRAILER-TRUCK.

1,367,905.

Specification of Letters Patent.   Patented Feb. 8, 1921.

Application filed October 6, 1920.   Serial No. 414,988.

*To all whom it may concern:*

Be it known that I, CHARLES T. WESTLAKE, a citizen of the United States, residing at St. Louis, Missouri, have invented a certain new and useful Improvement in Locomotive Trailer-Trucks, of which the following is a full, clear, and exact description, such as will enable others skilled in the art to which it appertains to make and use the same, reference being had to the accompanying drawings, forming part of this specification.

My invention relates generally to locomotives and more particularly to the trailing trucks thereof, the principal objects of my invention being to generally improve upon and simplify the construction of the existing and generally used forms of locomotive trailer trucks; to provide a relatively strong and substantial structure having a high degree of flexibility so as to yield readily while in service, and at the same time effect an equal distribution of the weight of the supported loads and likewise an even distribution of service strains and vibration; further, to provide means for yieldingly supporting the trailer truck frame upon the trailer truck axle, and which supporting means includes a pair of equalizers that are connected at their forward ends to the main equalizing system of the locomotive; to mount and fulcrum said equalizer members upon a separately formed transversely disposed yoke and which latter, by virtue of its construction, moves laterally with the truck frame as the same moves radially about its point of pivotal connection with the locomotive frame, thereby tending to maintain alinement between the equalizers, trailer truck springs, and trailer truck frame; and, further, to provide a locomotive trailer truck which will be very effective in performing its intended functions.

With the foregoing and other objects in view, my invention consists in certain novel features of construction and arrangement of parts, hereinafter more fully described and claimed, and illustrated in the accompanying drawings, in which—

Figure 1 is a plan view of a trailer truck of my improved construction and showing the same in position beneath the rear portion of the main frame of the locomotive.

Fig. 2 is a side elevational view of my improved trailer truck in position beneath the main frame of the locomotive.

Fig. 3 is a cross section taken approximately on the line 3—3 of Fig. 2.

Fig. 4 is an enlarged horizontal section taken approximately on the line 4—4 of Fig. 2.

Referring by numerals to the accompanying drawings, which illustrate a practical embodiment of my invention, 10, 10 designate the side members of the rear frame or cradle of the locomotive or that portion of the frame to the rear of the main drivers which support the rear end of the boiler, and formed integral with the forward ends of these members is a transversely disposed substantially box-shaped structure 11, open at its rear end for the accommodation of the forward end of the frame of my improved trailer truck, and the latter being pivotally connected to said box-shaped member by means of a vertically disposed king pin 12. By virtue of this construction, the trailer truck is arranged to swing laterally beneath the locomotive frame and radially with respect to the axis formed by the king pin 12.

Formed integral with the rear portions of the rear frame members 10 are laterally projecting brackets 10ª and depending from the undersides thereof are bearing members 13 that are provided with substantially flat smooth undersurfaces.

The frame of the trailer truck contemplated by my invention is preferably formed in a single piece, by casting, although said frame may be of assembled or fabricated structure. The forward portion of this frame comprises a pair of side members 14 which converge toward their forward ends, and the latter uniting to form a horizontally disposed head or bearing 15 that occupies the box-like structure 11 and receives the king pin 12.

Formed integral with and arranged between the members 14 and a short distance to the rear of their connected forward ends is a transversely disposed rail or beam 16. The rear portions 17 of the side members of the trailer truck frame or those portions to the rear of the converging forward portions 14 are disposed substantially parallel with each other and with the side rails 10 of the rear frame of the locomotive. These rear portions 17 are substantially of inverted U-shape in order to provide openings 18 for the accommodation of the journal boxes which receive the ends of the trailer truck axle A and the legs of said inverted U-shaped portions constitute pedestal jaws 19 to the sides of the journal box opening.

Suitable tie plates such as 20 connect the lower portions of the pedestal jaws and span the journal box openings between said jaws. The upper portions of the inverted U-shaped members 17 are bifurcated or slotted lengthwise to form longitudinally disposed openings 21 and which latter are for the accommodation of the semi-elliptic leaf springs 22, the central portions of which bear on top of the trailer truck journal boxes. The rear ends of the inverted U-shaped portions 17 of the side members of the trailer truck frame are connected by an integrally formed transversely disposed member 23 and arranged on top of the end portions of this member are upwardly projecting bearing blocks 24, the flat top surfaces of which are adapted to engage the undersurfaces of the bearing members 13 and which latter depend from the side rails 10 of the locomotive frame. These bearings 24 may be in the form of blocks, plates, rollers, or rockers, or any similar structure which will tend to reduce friction between the contacting parts as the trailer truck frame shifts laterally beneath the locomotive frame swinging about the king pin 12 as its pivotal axis.

The main equalizing system of the locomotive includes semi-elliptic springs 25 that are supported upon the journal boxes of the rear driving wheels 26 and supported by suitable links 27 that depend from the rear ends of the driver springs is a cross bar or equalizer 28. Depending from the ends of this cross bar or equalizer are hangers 29, the lower portions of which extend through suitable openings 20 that are formed in the box-shaped structure 11, and the lower ends of said hangers terminating at points adjacent to the sides of head or bearing 15 at the forward end of the trailer truck frame.

Overlying the intermediate portions of the converging members 14 of the trailer truck frame, and above the cross member 16, is a transversely disposed floating beam or yoke 31, from the ends of which depend box-shaped housings 32, and formed in the side walls of the latter are pairs of apertures 33 that are adapted to receive adjustable pins such as 34, and which latter serve as fulcrums for equalizing bars or members 35, the latter lying outside and immediately adjacent to the converging members 14.

Depending from the yoke or beam 31 are lugs or brackets 36 which are arranged between and adapted to be engaged by the side members 14 of the trailer truck frame when the latter shifts laterally in either direction around its pivot pin 12, beneath the locomotive frame, and by virtue of the engagement between the brackets 36 on the yoke or beam 31 and the side members 14, said yokes and the parts carried thereby will move with said trailer truck frame.

Carried on top of the end portions of yoke 31 are friction bearing plates 37, the same bearing against the underside of suitable friction bearing plates 38 that are carried by brackets 40ª and which latter project outwardly from side members 10 of the locomotive frame. The rear ends of equalizing members 35 are flexibly connected to the lower ends of hangers 40 and the upper ends of the latter are suspended from the forward ends of the trailer truck springs 22. Depending from the rear ends of these trailer truck springs are suitable hangers 41, the lower ends of which are pivotally connected to the rear portions of the inverted U-shaped members 19 of the trailer truck frame by bolts 42.

It will be seen that in my improved construction of trailer truck, the load carried by the rear portion of the locomotive frame or cradle is supported at two points to the rear of the wheel carrying axle of the trailer truck, and, in advance of said axle, upon the ends of a yoke or transverse member 31, to which latter are fulcrumed the equalizing members 35 that are supported by the rear driver springs of the locomotive and the trailer truck springs; and further, that the transverse member or yoke 31 upon which the equalizing members are fulcrumed is arranged to move laterally in unison with the radial movement of the trailer truck frame by the engagement of the brackets 36 with the side frame members of the trailer truck with the result that alinement is always maintained between said equalizer, the trailer truck springs, and the trailer truck frame. The floating yoke member 31 is adjustably pivoted and supported at its ends upon the equalizing bars 35, said yoke carrying friction plates which coöperate with bearing plates on the locomotive frame 10. This yoke is free to move vertically relative to the trailer truck, but when the trailer truck swings on its pivot point 12, the floating yoke and equalizing bars 35 are carried with the trailer truck. The forward ends of the equalizing bars 35 are supported by hangers 29 at points approximately in the transverse plane of the pivot point 12 (see Fig. 1), and the openings in the housing 11 of the locomotive frame through which these hangers 29 pass provide sufficient clearance to permit the slight swinging movement of these hangers in said openings. The weight of the boiler superposed upon the trailer truck frame 10 is applied to the trailer truck member through the bearing blocks 24 and this weight by its cantaliver action tends to lift the forward end of the trailer truck or to counterbalance it to some extent. The weight upon the forward end of the locomotive frame 10 is applied to the floating yoke 31 and in this way transmitted to the system of springs to which the equalizing bars 35 are connected. Thus, the weight on the forward end of the locomotive frame 10 is not carried directly by the forward end of the trailer truck frame.

Inasmuch as the forward ends of the equalizing members 35 are connected to the rear driver springs, said equalizers and the trailer truck springs 22 coöperate with the main equalizing system of the locomotive of which the rear driver springs 25 are a part, and, as a result, the weight of the supported load is equally distributed and a strong, substantial and yet flexible structure is produced which will be effective in absorbing and equalizing service strains and vibration.

To increase the range of adjustability of the equalizing members 35 and thus secure a more even distribution of the load, each of said members is preferably provided with a plurality of apertures 33 for the accommodation of the fulcrum pins 34 and which latter may be removably seated in any one pair of the apertures 33.

The wheels carried by the trailer truck axle A are located immediately adjacent to said inverted U-shaped portions 17 of the trailer truck side members and in order to provide ample room for the movement of said wheels during the lateral swing of the trailer truck frame, the adjacent portions of the locomotive frame may be made narrower as illustrated in Fig. 1 so as to provide a sufficient clearance space for the wheels.

A trailer truck frame of my improved construction is comparatively simple, is capable of being easily and cheaply produced, is very strong and durable, relatively light in weight, and is very effective in performing its intended functions.

It will be readily understood that minor changes in the size, form and construction of the various parts of my improved trailer truck frame can be made and substituted for those herein shown and described, without departing from the spirit of my invention, the scope of which is set forth in the appended claims.

I claim as my invention:

1. In a locomotive trailer truck, a truck frame, a wheel carrying axle, springs supported by said axle, a transversely disposed yoke arranged in front of the wheel carrying axle, and equalizer members fulcrumed to said yoke and connected to the trailer truck springs and adapted to be connected to the main equalizing system of the locomotive with which the trailer truck is associated.

2. The combination with a locomotive frame and the main equalizing system of the locomotive, of a trailer truck arranged beneath the rear portion of the locomotive frame and connected thereto for radial swinging movement, said trailer truck including a frame and a wheel carrying axle, springs supported by said wheel carrying axle and connected to the trailer truck frame, equalizing members connected to the trailer truck springs and to the main equalizing system of the locomotive, and a yoke upon which the main frame of the locomotive is adapted to bear and upon which said equalizing members are fulcrumed.

3. The combination with a locomotive frame and the main equalizing system of the locomotive, of a trailer truck arranged beneath the rear portion of the locomotive frame and connected thereto for radial swinging movement, said trailer truck including a frame and a wheel carrying axle, springs supported by said wheel carrying axle and connected to the trailer truck frame, equalizing members connected to the trailer truck springs and to the main equalizing system of the locomotive, a yoke upon which the main frame of the locomotive is adapted to bear and upon which said equalizing members are fulcrumed, and means whereby said yoke and its carried parts move laterally with the trailer truck frame during its radial movement.

4. A locomotive trailer truck including a frame that is adapted to be connected to the main frame of the locomotive, a wheel carrying axle journaled in the trailer truck frame, springs interposed between the wheel carrying axle and the trailer truck frame, equalizers connected to said springs and adapted to be connected to the main equalizing system of the locomotive with which the trailer truck is associated, and a separately formed member that is adapted to bear upon the main frame of the locomotive and upon which the equalizing members are fulcrumed.

5. A locomotive trailer truck including a frame that is adapted to be connected to the main frame of the locomotive, a wheel carrying axle journaled in the trailer truck frame, springs interposed between the wheel carrying axle and the trailer truck frame, equalizers connected to said springs and adapted to be connected to the main equalizing system of the locomotive with which the trailer truck is associated, a separately formed member that is adapted to bear upon the main frame of the locomotive and upon which the equalizing members are fulcrumed, and means whereby said separately formed member and parts carried thereby move laterally with the trailer truck frame during its radial swinging movement.

6. The combination with a locomotive main frame and a trailer truck frame, of a transversely disposed yoke member that bears against the main frame of the locomotive, and equalizers fulcrumed on said yoke member, which equalizers are connected to the main equalizing system of the locomotive.

7. The combination with a locomotive main frame and a trailer truck frame, of a transversely disposed yoke member that bears against the main frame of the locomotive, and equalizers fulcrumed on said yoke member, which equalizers are connected to the main equalizing system of the locomotive and to the trailer truck springs.

8. The combination with a locomotive main frame and a trailer truck frame, of a transversely disposed yoke member arranged to move vertically independent of the trailer truck frame and to move laterally therewith, and equalizer members fulcrumed on said yoke member, which equalizer members are connected to the main equalizing system of the locomotive.

9. The combination with a locomotive main frame and a trailer truck frame, of a transversely disposed yoke member arranged to move vertically independent of the trailer truck frame and to move laterally therewith, and equalizer members fulcrumed on said yoke member, which equalizer members are connected to the main equalizing system of the locomotive and to the springs of the trailer truck.

10. The combination with a locomotive frame, of a trailer truck frame positioned beneath said locomotive frame, a transversely disposed yoke member overlying the front portion of the trailer truck frame, said locomotive frame bearing upon the rear portion of the trailer truck frame and upon said yoke member, and equalizers fulcrumed on said yoke member, which equalizers are connected to the main equalizing system of the locomotive and with the springs of the trailer truck.

11. The combination with a locomotive frame, of a trailer truck frame positioned beneath said locomotive frame, a transversely disposed yoke member overlying the front portion of the tailer truck frame, said locomotive frame bearing upon the rear portion of the trailer truck frame and upon said yoke member, equalizers fulcrumed on said yoke member, which equalizers are connected to the main equalizing system of the locomotive and with the springs of the trailer truck, and means whereby the yoke member and parts carried thereby move laterally with the trailer truck in its radial movement beneath the locomotive frame.

In testimony whereof I hereunto affix my signature this 23rd day of Sept., 1920.

CHARLES T. WESTLAKE.